(12) United States Patent
Nakayama

(10) Patent No.: US 7,659,942 B2
(45) Date of Patent: Feb. 9, 2010

(54) BROADCAST RECEIVER

(75) Inventor: Takao Nakayama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 816 days.

(21) Appl. No.: 11/303,540

(22) Filed: Dec. 16, 2005

(65) Prior Publication Data

US 2006/0221257 A1 Oct. 5, 2006

(30) Foreign Application Priority Data

Mar. 29, 2005 (JP) ............................. 2005-096391

(51) Int. Cl.
*H04N 5/445* (2006.01)
*H04N 5/60* (2006.01)

(52) U.S. Cl. ...................... 348/564; 348/738

(58) Field of Classification Search ................. 348/552, 348/462, 468, 465, 632, 589, 569, 600, 738, 348/563, 564; *H04N 7/00, 11/00, 9/74, 9/76, H04N 5/50, 3/24, 5/60, 5/445*
See application file for complete search history.

(56) References Cited

U.S. PATENT DOCUMENTS

| | | | |
|---|---|---|---|
| 5,327,176 A * | 7/1994 | Forler et al. ................. | 348/564 |
| 5,408,273 A * | 4/1995 | Okamura ..................... | 348/632 |
| 7,467,088 B2 * | 12/2008 | Momosaki et al. .......... | 348/563 |
| 7,502,386 B2 * | 3/2009 | Goto ........................... | 348/461 |
| 2002/0061095 A1 | 5/2002 | Beecroft | |
| 2003/0045265 A1 | 3/2003 | Huang et al. | |
| 2004/0038716 A1 | 2/2004 | Gass | |
| 2006/0044479 A1 * | 3/2006 | Heo ............................ | 348/738 |
| 2009/0074378 A1 | 3/2009 | Momosaki et al. | |

FOREIGN PATENT DOCUMENTS

| | | | |
|---|---|---|---|
| EP | 0 614 315 A2 | 9/1994 | |
| EP | 1 251 693 A2 | 10/2002 | |
| EP | 1 370 053 A1 | 12/2003 | |
| GB | 2 343 810 A | 5/2000 | |
| JP | 10-320892 A | 12/1998 | |
| JP | 2002-369157 A | 12/2002 | |
| JP | 2003-263872 A | 9/2003 | |
| JP | 2005-64599 A | 3/2005 | |
| WO | WO 03081878 A1 * | 10/2003 | |

OTHER PUBLICATIONS

Japanese Office Action dated Oct. 27, 2009 (5 pages), and English translation thereof (6 pages), issued in counterpart Japanese Application Serial No. 2005-096391.

* cited by examiner

*Primary Examiner*—Sherrie Hsia
(74) *Attorney, Agent, or Firm*—Frishauf, Holtz, Goodman & Chick, P.C.

(57) ABSTRACT

A broadcast receiver includes a varying unit which varies an output volume of broadcast audio, a display unit which displays a subtitle, which represents content of the broadcast audio, and a control unit which controls the display unit to display the subtitle when the broadcast receiver is in an operation mode in which subtitles are not displayed and when the output volume is less than a predetermined value.

8 Claims, 4 Drawing Sheets

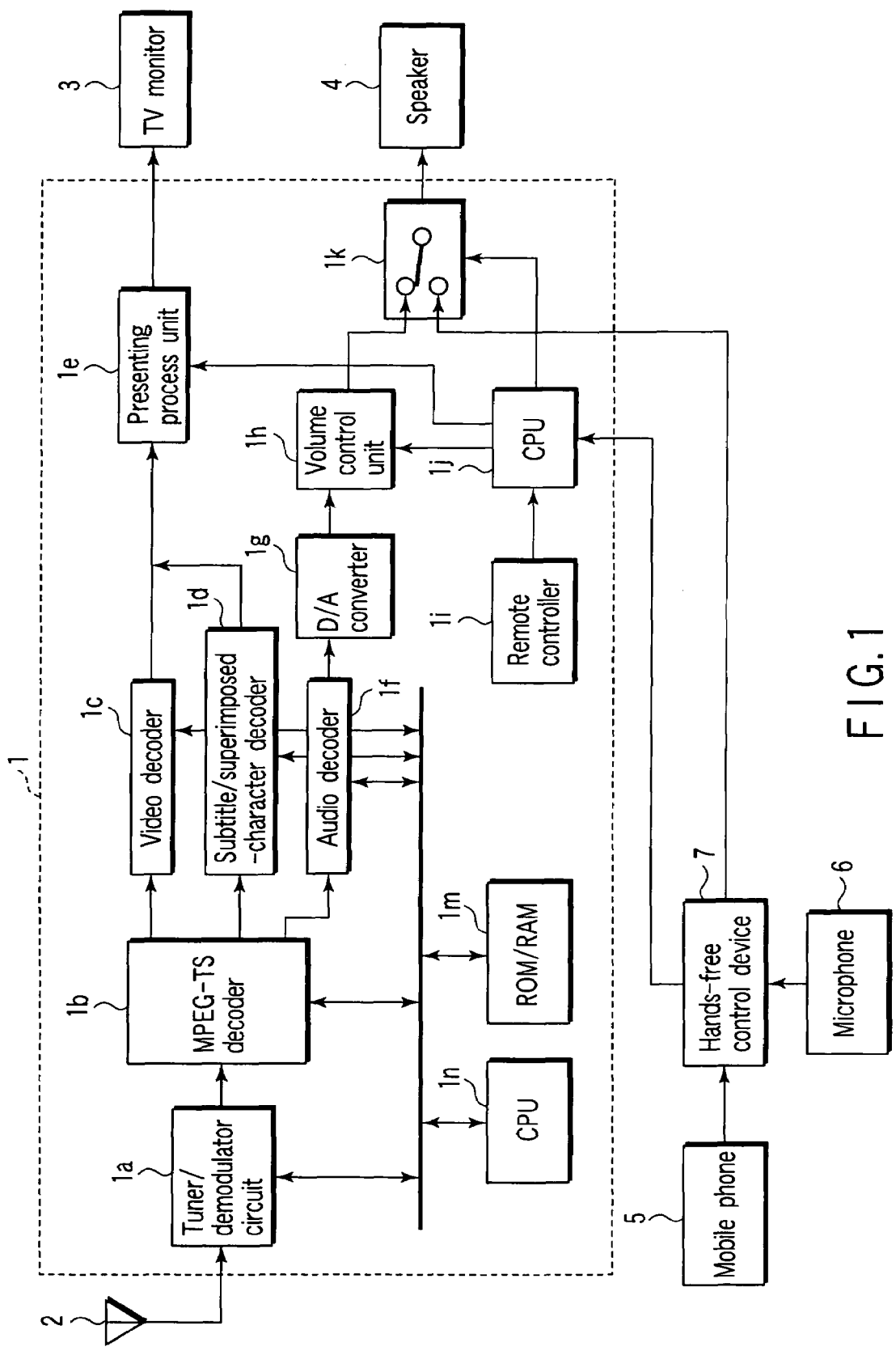
F I G. 1

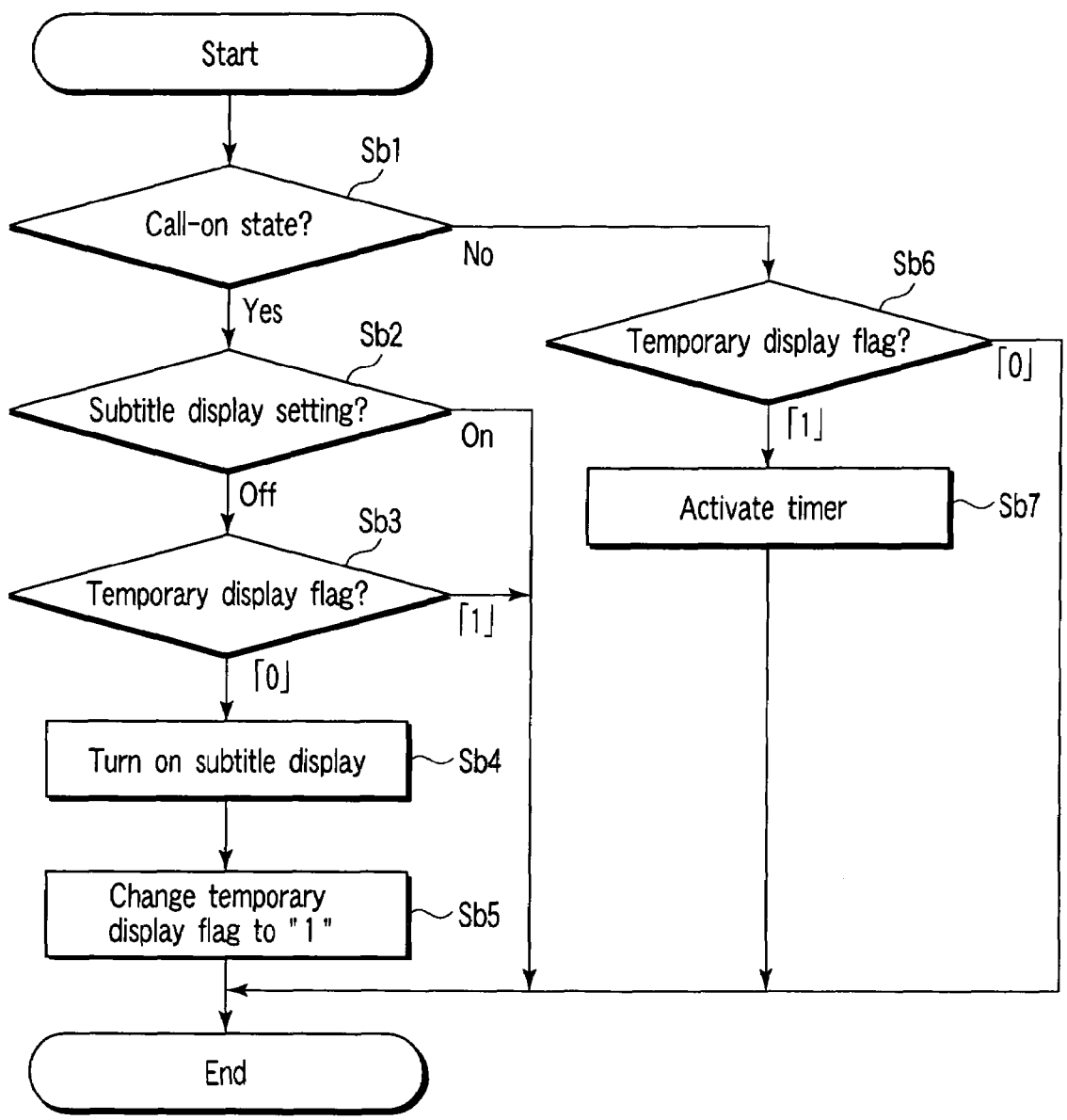
F I G. 3

US 7,659,942 B2

BROADCAST RECEIVER

CROSS-REFERENCE TO RELATED APPLICATIONS

This application is based upon and claims the benefit of priority from prior Japanese Patent Application No. 2005-096391, filed Mar. 29, 2005, the entire contents of which are incorporated herein by reference.

BACKGROUND OF THE INVENTION

1. Field of the Invention

The present invention relates to a broadcast receiver such as a digital broadcast receiver that outputs broadcast audio.

2. Description of the Related Art

For example, if a hands-free phone is used in an automobile while TV broadcast or music broadcast is being viewed/listened to, the broadcast audio hinders a call conversation. Besides, there is a case in which a loudspeaker in the hands-free phone is used to output broadcast audio and a call voice. In consideration of these circumstances, techniques for automatically muting output of broadcast audio or attenuating the output volume of broadcast audio have already been realized (see, for instance, Jpn. Pat. Appln. KOKAI Publication No. 10-320892 or Jpn. Pat. Appln. KOKAI Publication No. 2003-263872).

In digital broadcast, there is a case where video information is accompanied with subtitle information. The display/non-display of the subtitle information can arbitrarily be set by the viewer/listener. The subtitle, in this context, refers to displayed characters representing contents of, e.g. conversations in programs.

If the display of subtitles is always set in the ON state, it is possible to understand the content of broadcast audio from the displayed subtitles, even if the output of broadcast audio is temporarily attenuated, as mentioned above. However, the subtitles are laid over a picture and make the picture a little difficult to view. Thus, in many cases, the display of subtitles is set in the OFF state.

If the output volume of broadcast audio is temporarily attenuated because of a phone conversion, as mentioned above, while the subtitles are being set in the OFF state, even a viewer/listener, who is not the person being engaged with the phone conversion, has difficulty in listening to the broadcast audio and is unable to easily understand the content of the broadcast audio.

BRIEF SUMMARY OF THE INVENTION

Under the circumstances, there has been a demand for a technique that enables a viewer/listener to understand the content of broadcast audio even when an output volume of broadcast audio is temporarily attenuated.

According to an aspect of the present invention, there is provided a broadcast receiver comprising: a varying unit which varies an output volume of broadcast audio, which is broadcast; a display unit which displays a subtitle, which represents content of the broadcast audio; and a control unit which controls the display unit to display the subtitle when the broadcast receiver is in an operation mode inhibiting displaying subtitles and when the output volume is less than a predetermined value.

According to another aspect of the present invention, there is provided a broadcast receiver which includes an internal display or is connectable to an external display, comprising: a varying unit which varies an output volume of broadcast audio; a first control unit which controls the internal display or the external display such that a subtitle representative of content of the audio is displayed only at a time of an operation mode in which subtitles are displayed; and a second control unit which controls the internal display or the external display such that the subtitle is displayed when the broadcast receiver is in an operation mode in which subtitles are not displayed and when the output volume is less than a predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram that shows the structure of a broadcast receiver according to an embodiment of the present invention;

FIG. 3 is a flow chart that illustrates a process procedure of the CPU shown in FIG. 1, which relates to temporary display of subtitles that is started upon a call conversation;

DETAILED DESCRIPTION OF THE INVENTION

Figure 2:
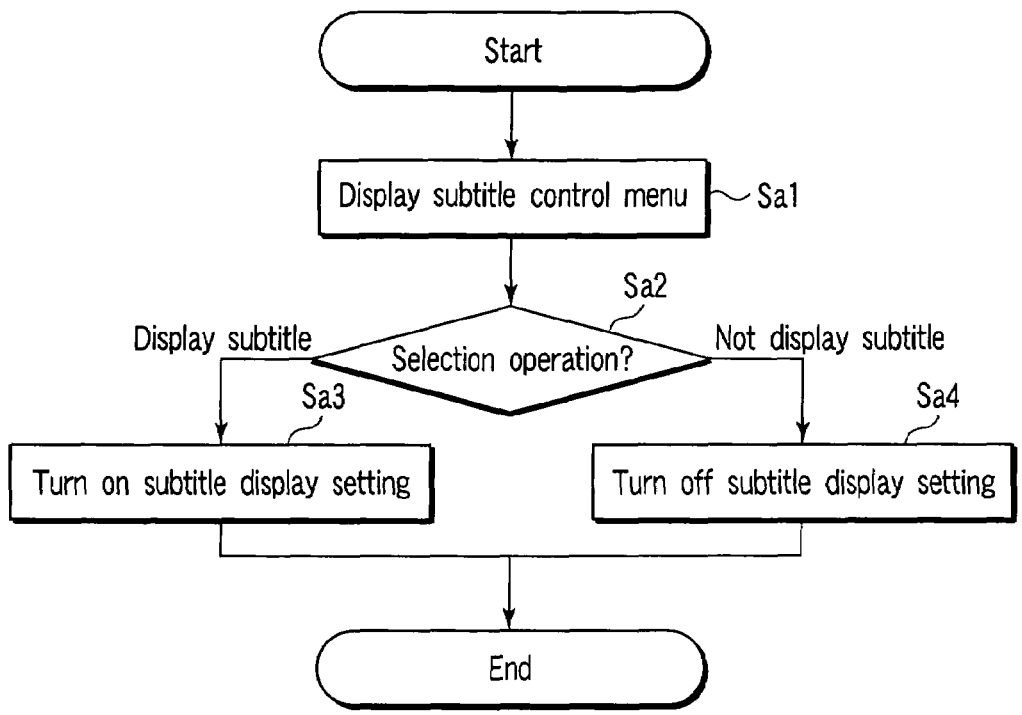
FIG. 2 is a flow chart that illustrates a process procedure of a CPU shown in FIG. 1, which relates to a change of subtitle display setting.

An embodiment of the present invention will now be described with reference to the accompanying drawings.

FIG. 1 is a block diagram that shows the structure of a broadcast receiver 1 according to the embodiment. In this embodiment, a vehicle-mount-type digital broadcast receiver is assumed. An antenna 2, a TV monitor 3, a speaker 4 and a hands-free control device 7 are connected to the broadcast receiver 1. A mobile phone 5 and a microphone 6 are connected to the hands-free control device 7.

The broadcast receiver 1 includes a tuner/demodulator circuit 1a, an MPEG-TS decoder 1b, a video decoder 1c, a subtitle/superimposed-character decoder 1d, a presenting process unit 1e, an audio decoder 1f, a D/A converter 1g, a volume control unit 1h, a remote controller 1i, a CPU 1j, a switch 1k, a ROM/RAM 1m and a CPU 1n.

A reception signal that is received by the antenna 2 is delivered to the tuner/demodulator circuit 1a. The tuner/demodulator circuit 1a selects an arbitrary radio transmission channel, and demodulates a transport stream that is transmitted over the selected channel. The transport stream conforms to, e.g. MPEG-2. The radio channel to be selected is told from the CPU in to the tuner/demodulator circuit 1a. The MPEG-TS decoder 1b separates/extracts, from the transport stream, a video/audio stream, a data broadcast stream and subtitle/superimposed-character data, which relate to an arbitrary program. The program to be extracted is told from the CPU in to the MPEG-TS decoder 1b.

The video decoder 1c decodes the video stream that is extracted by the MPEG-TS decoder 1b, and obtains video data. The subtitle/superimposed character decoder 1d decodes the subtitle/superimposed-character data that is extracted by the MPEG-TS decoder 1b, and obtains video data that is representative of subtitles or superimposed characters. The subtitle refers to a character string that represents, in usual cases, content of broadcast audio such as spoken lines, which accompanies a broadcast program. The superimposed character refers to a character string such as earthquake information, which is not related to the broadcast program. The presenting process unit 1e generates a video signal that represents video for display. The video for display refers to a picture that is produced by combining, where necessary, video represented by video data output from the subtitle/superimposed character decoder 1d, with video represented by video data output from the video decoder 1c. The TV monitor 3 displays a picture on the basis of the video signal output from the presenting process unit 1e. The CPU 1j instructs whether the subtitle/superimposed character is to be displayed or not.

The audio decoder 1f decodes the audio stream that is extracted by the MPEG-TS decoder 1b, and obtains audio data. The D/A converter 1g subjects the audio data to D/A conversion, thereby obtaining an audio signal. Hereinafter, the audio signal, which is obtained by the D/A converter 1g, is referred to as "broadcast audio signal". The volume control unit 1h adjusts the signal level of the broadcast audio signal under the control of the CPU 1j. The broadcast audio signal with the adjusted signal level is input to one input terminal of the switch 1k. To the other input terminal of the switch 1k, an audio signal (hereinafter referred to as "reception-call audio signal") that is received by the mobile phone 5 is input via the hands-free control device 7. The switch 1k selects one of the broadcast audio signal and the reception-call audio signal under the control of the CPU 1j. The speaker 4 reproduces the broadcast audio or the reception-call audio, on the basis of the broadcast audio signal or the reception-call audio signal, which is selected by the switch 1k. Thus, the volume control unit 1h adjusts an output volume in connection with the broadcast audio.

The remote controller 1i inputs an instruction to vary the output volume relating to the broadcast audio. The CPU 1j controls the volume control unit 1h so as to vary the output volume of the broadcast audio in accordance with the volume-varying instruction that is input from the remote controller 1i. In addition, the CPU 1j controls the switch 1k in accordance with the operation state of the mobile phone 5. Further, the CPU 1j controls the presenting process unit 1e in accordance with the output volume of the broadcast audio or the operation state of the mobile phone 5.

The ROM/RAM 1m stores, e.g. a control program for the CPU in. The CPU in controls the tuner/demodulator circuit 1a, MPEG-TS decoder 1b, video decoder 1c, subtitle/superimposed-character decoder 1d and audio decoder 1f so as to receive an arbitrary program.

The mobile phone 5 executes telephone communication over a mobile communication network. The microphone 6 receives a transmission-call voice and generates a corresponding transmission-call audio signal. The hands-free control device 7 monitors the operation state of the mobile phone 5 and informs the CPU 1j of the monitored operation state. The hands-free control device 7 sends the reception-call audio signal, which is received by the mobile phone 5, to the switch 1k. The hands-free control device 7 sends the transmission-call audio signal, which is output from the microphone 6, to the mobile phone 5.

Next, the operation of the broadcast receiver 1 with the above-described structure is described.

One of many broadcast programs, which is designated by, e.g. the user, is extracted by the tuner/demodulator circuit 1a and MPEG-TS decoder 1b. If the program includes a video stream, a picture represented by the video stream is displayed on the TV monitor 3 by the video decoder 1c and presenting process unit 1e. If the program includes an audio stream, broadcast audio that is represented by the audio stream is reproduced from the speaker 4 by the audio decoder 1f, D/A converter 1g and volume control unit 1h. If the program includes subtitle/superimposed-character data, subtitles or superimposed characters represented by the subtitle/superimposed-character data can be displayed on the TV monitor 3 by the subtitle/superimposed-character decoder 1d and presenting process unit 1e. The subtitle/superimposed-character data, however, is not always displayed but is displayed only where necessary in accordance with the subtitle display setting by the presenting process unit 1e under the control of the CPU 1j. The subtitle display setting is one of setting items of the broadcast receiver 1, which is set by the user. The CPU 1j manages the subtitle display setting in accordance with an instruction that is input by the user through the remote controller 1i.

FIG. 2 is a flow chart that illustrates a process procedure of the CPU 1j, which relates to a change of the subtitle display setting.

In step Sa1, the CPU 1j controls the presenting process unit 1e to cause the TV monitor 3 to display a subtitle control menu. The subtitle control menu is a menu showing items that can be designated by the user in connection with subtitles. The subtitle control menu includes selection items of "display subtitles" and "not display subtitles". Based on the subtitle control menu, the user designates "display subtitles" or "not display subtitles" by means of the remote controller 1i.

In step Sa2, the CPU 1j confirms whether a selection operation for designating "display subtitles" and "not display subtitles" has been executed by the remote controller 1i. If "display subtitles" is designated, the CPU 1j advances from step Sa2 to step Sa3. In step Sa3, the CPU 1j sets the subtitle display setting in the ON state. On the other hand, if "not display subtitles" is designated, the CPU 1j advances from step Sa2 to step Sa4. In step Sa4, the CPU 1j sets the subtitle display setting in the OFF state.

In the case where a telephone call is received by the mobile phone 5 or a telephone call is transmitted from the mobile phone 5, the mobile phone 5 informs the CPU 1j via the hands-free control device 7 of the call reception/transmission. Responding to the information, the CPU 1j operates the switch 1k so as to select the hands-free control device 7. If the telephone call is finished by the mobile phone 5, the mobile phone 5 informs the CPU 1j via the hands-free control device 7 of the end of the telephone call. Responding to this, the CPU 1j operates the switch 1k so as to select the volume control unit 1h. In the description below, the state in which the switch 1k selects the hands-free control device is referred to as "call-ON state".

On the other hand, the CPU 1j executes a process, as shown in FIG. 3, at a predetermined timing, e.g. at predetermined time intervals.

In step Sb1, the CPU 1j confirms whether the present state is the call-ON state or not. If the present state is the call-ON state, the CPU 1j advances from step Sb1 to step Sb2. In step Sb2, the CPU 1*j* confirms the subtitle display setting. If the subtitle display setting is in the OFF state, the CPU 1*j* advances from step Sb2 to step Sb3. In step Sb3, the CPU 1*j* confirms a temporary display flag. The temporary display flag is initialized to "0" when the broadcast receiver 1 is powered on. If the temporary display flag is "0", the CPU 1*j* advances from step Sb3 to step Sb4.

In step Sb4, the CPU 1*j* instructs the presenting process unit 1*e* to turn on the subtitle display. Upon receiving the instruction, the presenting process section 1*e* causes the TV monitor 3 to display a subtitle that is represented by the subtitle data output from the subtitle/superimposed-character decoder 1*d*. In step Sb5, the CPU 1*j* changes the temporary display flag to "1", and completes the process of FIG. 3. Thus, in the call-ON state, the broadcast audio is muted, and the call voice is output from the speaker 4. At this time, in order to compensate the muting of the broadcast audio, the subtitle is displayed even if the subtitle display setting is in the OFF state. The display of subtitles in this state is referred to as "temporary display". While the temporary display is being executed, the temporary display flag is changed to "1".

If the subtitle display setting is in the ON state or if the temporary display flag is "1", the display of subtitles is already effected. Accordingly, the CPU 1*j* advances from step Sb2 or step Sb3 and completes the process of FIG. 3. Thus, the current operation state is maintained.

On the other hand, if the present state is not the call-ON state, the CPU 1*j* advances from step Sb1 to step Sb6. In step Sb6, the CPU 1*j* confirms the temporary display flag. Immediately after the end of the call that caused the temporary display to begin, the temporary display flag is "1". If the temporary display flag is "1", the CPU 1*j* advances from step Sb6 to step Sb7. In step Sb7, the CPU 1*j* activates a timer and then completes the process of FIG. 3. The timer is realized by the process of another routine, which is executed by the CPU 1*j*. The timer measures a preset time (e.g. 3 seconds). The time to be measured by the timer may be fixed or may arbitrarily be set by the user.

On the other hand, if the temporary display flag is "0", the CPU 1*j* advances from step Sb6 and completes the process of FIG. 3. Thus, the current operation state is maintained.

Figure 4:
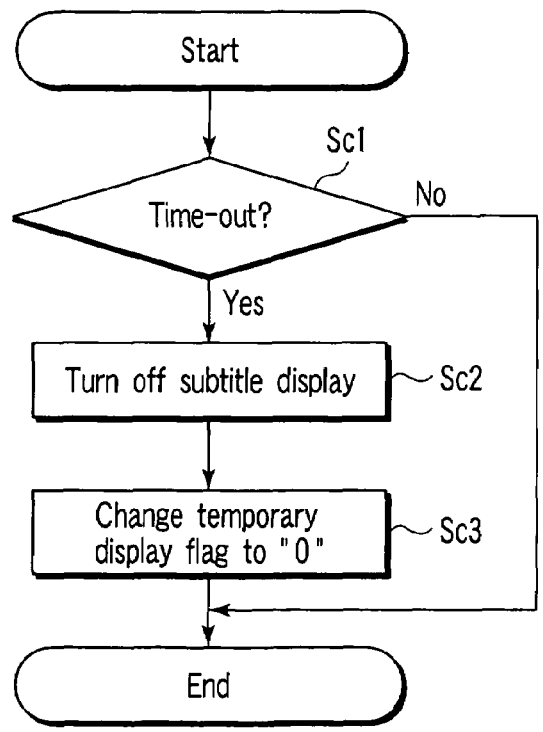
FIG. 4 is a flow chart that illustrates a process procedure of the CPU shown in FIG. 1, which relates to cancel of temporary display.

While the timer is being activated, the CPU 1*j* executes a process of FIG. 4 at a predetermined timing, e.g. at predetermined time intervals.

In step Sc1, the CPU 1*j* confirms whether time-out occurs in the timer. If time-out occurs in the timer, the CPU 1*j* advances from step Sc1 to step Sc2. In step Sc2, the CPU 1*j* instructs the presenting process unit 1*e* to turn off the subtitle display. Upon receiving the instruction, the presenting process unit 1*e* stops the display of subtitles. Thereby, the temporary display is set in the OFF state. In step Sc3, the CPU 1*j* changes the temporary display flag to "0" and completes the process of FIG. 4.

If time-out does not occur in the timer, the CPU 1*j* advances from step Sc1 and completes the process of FIG. 4. Thus, the current operation state is maintained.

After the end of the call that caused temporary display to begin, the temporary display is continued for the time being. Upon time-out of the timer, the temporary display is stopped.

In the meantime, the user can instruct an increase or a decrease in output volume of broadcast audio, using the remote controller 1*i*. If this operation is started, the CPU 1*j* executes a process as illustrated in FIG. 5.

In step Sd1, the CPU 1*j* confirms the content of the volume operation. If a decrease in volume is instructed, the CPU 1*j* advances from step Sd1 to step Sd2. In step Sd2, the CPU 1*j* confirms whether the current volume is a minimum value. If it is not the minimum value, the CPU 1*j* advances from step Sd2 to step Sd3. In step Sd3, the CPU 1*j* instructs the volume control unit 1*h* to attenuate the volume by one step. Upon receiving the instruction, the volume control unit 1*h* decreases the signal level of the broadcast audio signal at a predetermined rate.

In step Sd4, the CPU 1*j* confirms the subtitle display setting. If the subtitle display setting is in the OFF state, the CPU 1*j* advances from step Sd4 to step Sd5. In step Sd5, the CPU 1*j* determines whether the attenuated volume agrees with a threshold value. If the attenuated volume agrees with the threshold value, the CPU 1*j* advances from step Sd5 to step Sd6. In step Sd6, the CPU 1*j* instructs the presenting process unit 1*e* to set the subtitle display in the ON state. Upon receiving the instruction, the presenting process unit 1*e* causes the TV monitor 3 to display a subtitle that is represented by the subtitle data output from the subtitle/superimposed-character decoder 1*d*. In step Sd7, the CPU 1*j* changes the temporary display flag to "1", and completes the process of FIG. 5. As described above, the output volume of broadcast audio is decreased by the instruction from the user. If the volume decreases to the threshold value, the subtitle is displayed even if the subtitle display setting is in the OFF state. Then, the temporary flag is set at "1".

Figure 5:
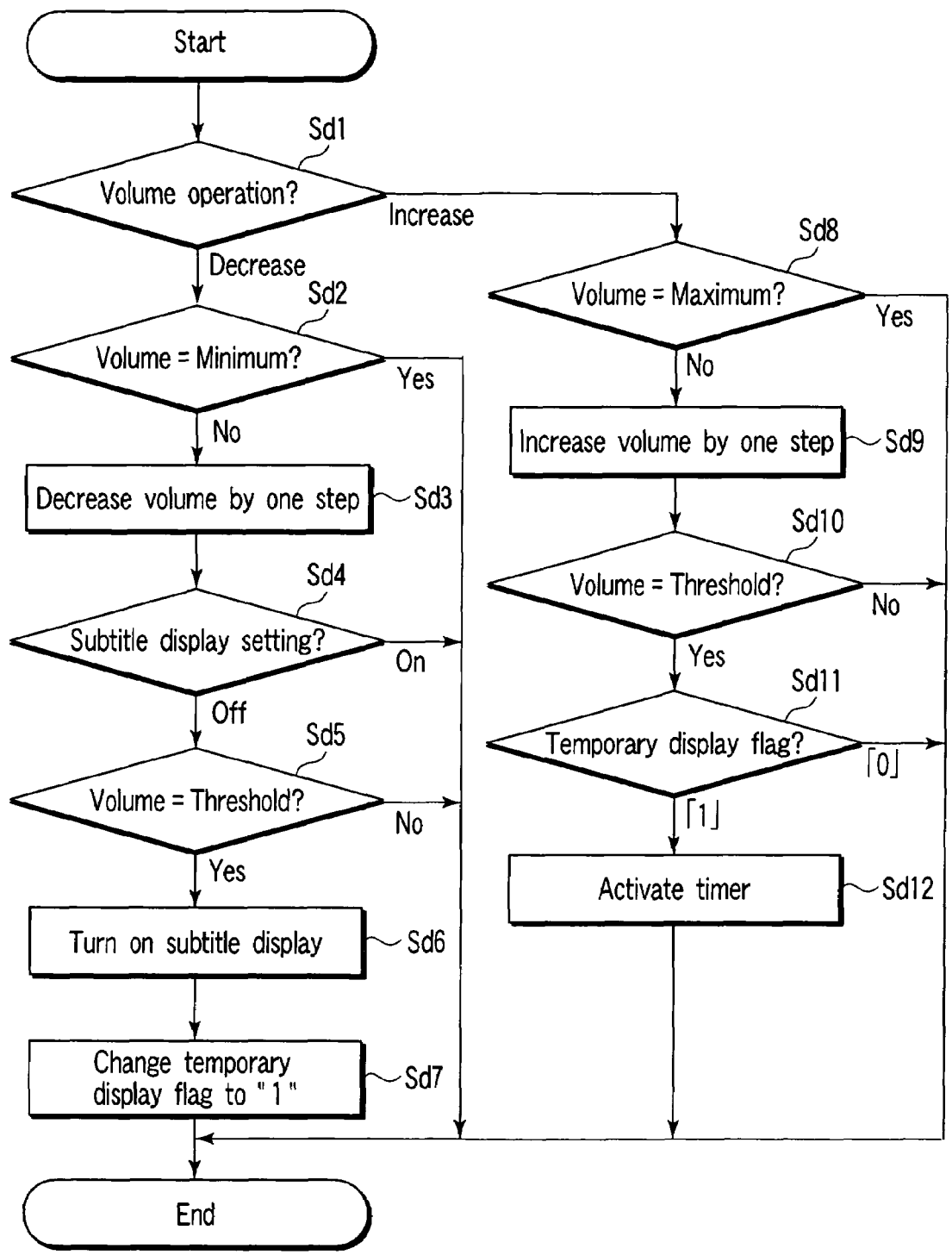
FIG. 5 is a flow chart that illustrates a process procedure of the CPU shown in FIG. 1, which relates to temporary display of subtitles that is started upon attenuation of an output volume of broadcast audio.

In the case where the volume prior to alteration is already the minimum value, where the subtitle display setting is in the ON state or where the volume after alteration does not agree with the threshold value, the CPU 1*j* advances from step Sd2, Sd4 or Sd5 and completes the process of FIG. 5. Thus, the current operation state is maintained.

On the other hand, if an increase in volume is instructed, the CPU 1*j* advances from step Sd1 to step Sd8. In step Sd8, the CPU 1*j* determines whether the current volume is a maximum value. If the current volume is not the maximum value, the CPU 1*j* advances from step Sd8 to step Sd9. In step Sd9, the CPU 1*j* instructs the volume control unit 1*h* to increase the volume by one step. Upon receiving the instruction, the volume control unit 1*h* increases the signal level of the broadcast audio signal at a predetermined rate.

In step Sd10, the CPU 1*j* determines whether the increased volume agrees with a threshold value. If the increased volume agrees with the threshold value, the CPU 1*j* advances from step Sd10 to step Sd11. In step Sd11, the CPU 1*j* confirms the temporary display flag. In the case where the temporary display is effected by the decrease in volume, as mentioned above, the temporary display flag is "1". If the temporary display flag is "1", the CPU 1*j* advances from step Sd11 to step Sd12. In step Sd12, the CPU 1*j* activates the timer and completes the process of FIG. 5. This timer is the same as the timer that is activated in the process of FIG. 3.

In the case where the volume prior to alteration is already the maximum value, where the volume after alteration does not agree with the threshold value or where the temporary display flag is "0", the CPU 1*j* advances from step Sd8, Sd10 or Sd11 and completes the process of FIG. 5. Thus, the current operation state is maintained.

As has been described above, according to the present embodiment, while broadcast audio is being muted because of a call using the mobile phone 5, the subtitle is displayed even if the subtitle display setting is in the OFF state. In addition, when the output volume of broadcast audio is decreased to the threshold value or less, the subtitle is displayed even if the subtitle display setting is in the OFF state. In these operation states, it is difficult to hear the content of broadcast audio, but it is possible to visually confirm the content of broadcast audio by subtitles. To be more specific, there is such a case that while a plurality of users are viewing/ listening to broadcast, one of the users is engaged with a telephone call or the volume of broadcast audio is attenuated due to a personal reason of one of the users. Even in such a case, the other users can continuously confirm the content of the broadcast audio. Moreover, these users do not need to turn on/off the subtitle display setting.

Subtitles on digital broadcast are, as much as possible, consistent with the content of conversations in the actual broadcast. Assume now that a broadcast program contains a conversion: "Mother, I want to have hamburger for supper. It's a great favorite of mine". In this case, subtitles, "Mother, I want to have hamburger for supper. It's a great favorite of mine.", are prepared for display during this time. Accordingly, the subtitles, "Mother, I want to have hamburger for supper. It's a great favorite of mine.", are displayed even if the display of subtitles is turned on at a timing during the conversation, for example, at a timing when the beginning word "Mother" is uttered in the conversation. Thus, even if the display of subtitles is started when broadcast audio is muted or the output volume of broadcast audio is attenuated, the user has no unnatural feeling.

However, if the display of subtitles is turned off at a timing when the muting of broadcast audio is released or when the output volume of broadcast audio is increased, the user may have unnatural feeling or the user may be unable to exactly understand the content of broadcast audio. For example, when the above-mentioned conversation begins, the subtitles, "Mother, I want to have hamburger for supper. It's a great favorite of mine.", are displayed. If the display of subtitles is turned off at a timing when the beginning word "Mother" is uttered in the conversation, the above subtitles are displayed only for a moment, and then the audio, "I want to have hamburger for supper. It's a great favorite of mine.", is output.

In the present embodiment, however, even if the muting of broadcast audio is released or the output volume of broadcast audio is increased, the temporary display of subtitles is continued during the time that is measured by the timer. During this time, the user can exactly understand the content of the broadcast audio from both the broadcast audio and subtitles.

The present embodiment can variously be modified, as will be described below.

It is possible to execute only one of the temporary display of subtitles due to a telephone call or the temporary display of subtitles due to a decrease in output volume of broadcast audio.

In the case where broadcast audio is automatically muted or the output volume is attenuated, the temporary display of subtitles in the present invention can be executed regardless of an event that is a trigger for the muting or attenuation. For example, a signal indicative of the on-hook/off-hook state of the phone may be input. When the phone is in the off-hook state, the broadcast audio may be muted or the output volume of broadcast audio may be attenuated, and the temporary display of subtitles may be effected. This modification is effective in such a case that a reception-call voice is not output from the speaker of the broadcast receiver, but the broadcast receiver and the telephone are operated in cooperation so as to prevent the output of broadcast audio from hindering the telephone conversation.

It is possible to immediately stop the temporary display of subtitles when the muting of broadcast audio is released or when the output volume of broadcast audio is increased.

The present invention is applicable to a portable-type or a stationary-type broadcast receiver.

The phone to be connected may be another type of phone such as a wired phone.

The present invention is applicable to a broadcast receiver that receives analog broadcast.

One or more of, or all of, the antenna 2, TV monitor 3, speaker 4, mobile phone 5, microphone 6 and hands-free control device 7 may be incorporated in the broadcast receiver 1.

Subtitles may be generated by the broadcast receiver 1 on the basis of a result of speech recognition of broadcast audio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcast receiver comprising:
 a varying unit which varies an output volume of broadcast audio;
 a display unit which displays a subtitle, which represents content of the broadcast audio; and
 a control unit which controls the display unit to display the subtitle when (i) the broadcast receiver is in an operation mode in which subtitles and are not displayed and (ii) the output volume is less than a predetermined value;
 wherein the control unit controls the display unit such that in a case in which the output volume is varied from a value that is less than the predetermined value to a value that is not less than the predetermined value when the broadcast receiver is in the operation mode in which subtitles are not displayed, the display of the subtitle is continued for a predetermined time period from a time instant of the variation of the output volume.

2. The broadcast receiver according to claim 1, wherein the varying unit decreases the output volume below the predetermined value when a telephone conversation is conducted near the broadcast receiver.

3. The broadcast receiver according to claim 1, wherein the broadcast receiver includes an internal speaker, or the broadcast receiver is connectable to an external speaker, and the broadcast audio and a reception-call voice for a telephone conversation are output from the internal speaker or the external speaker, and
 wherein the varying unit decreases the output volume below the predetermined value when the reception-call voice is output from the internal speaker or the external speaker.

4. The broadcast receiver according to claim 1, wherein the varying unit varies the output volume in accordance with a request by a user.

5. A broadcast receiver which includes an internal display or is connectable to an external display, the broadcast receiver comprising:
 a varying unit which varies an output volume of broadcast audio;
 a first control unit which controls the internal display or the external display such that a subtitle representative of content of the audio is displayed only at a time of an operation mode in which subtitles are displayed; and
 a second control unit which controls the internal display or the external display such that the subtitle is displayed when (i) the broadcast receiver is in an operation mode in which subtitles are not displayed and (ii) the output volume is less than a predetermined value;
 wherein the second control unit controls the internal display or the external display such that in a case in which the output volume is varied from a value that is less than the predetermined value to a value that is not less than the predetermined value when the broadcast receiver is in the operation mode in which subtitles are not displayed, the display of the subtitle is continued for a predetermined time period from a time instant of the variation of the output volume.

6. The broadcast receiver according to claim 5, further comprising a unit which detects a call-ON state in which a telephone conversation is conducted near the broadcast receiver, wherein the varying unit decreases the output volume below the predetermined value when the call-ON state is detected.

7. The broadcast receiver according to claim 5, further comprising:

a unit connectable to an external speaker, or a internal speaker; and a unit which outputs the broadcast audio and a reception-call voice for a telephone conversation from the internal speaker or the external speaker, wherein the varying unit decreases the output volume below the predetermined value when the reception-call voice is output from the internal speaker or the external speaker.

8. The broadcast receiver according to claim 5, further comprising a unit which inputs a request for varying the output volume by a user, wherein the varying unit varies the output volume in accordance with the request.

* * * * *